(12) United States Patent
McMurray et al.

(10) Patent No.: US 10,828,597 B2
(45) Date of Patent: *Nov. 10, 2020

(54) SORBENT COMPOSITIONS HAVING PNEUMATIC CONVEYANCE CAPABILITIES

(71) Applicant: ADA Carbon Solutions, LLC, Littleton, CO (US)

(72) Inventors: Sarah G. McMurray, Edgewater, CO (US); Jacob B. Lowring, Coushatta, LA (US); Brian Leen, Littleton, CO (US)

(73) Assignee: ADA Carbon Solutions, LLC, Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,222

(22) Filed: Dec. 21, 2018

(65) Prior Publication Data

US 2019/0358578 A1 Nov. 28, 2019

Related U.S. Application Data

(60) Continuation of application No. 15/426,627, filed on Feb. 7, 2017, now Pat. No. 10,159,928, which is a
(Continued)

(51) Int. Cl.
*B01D 53/02* (2006.01)
*B01D 53/10* (2006.01)
(Continued)

(52) U.S. Cl.
CPC ............. *B01D 53/10* (2013.01); *B01D 53/64* (2013.01); *B01D 53/83* (2013.01); *B01J 20/20* (2013.01);
(Continued)

(58) Field of Classification Search
CPC ........ B01D 2253/102; B01D 2253/304; B01D 2257/504; B01D 2257/602; B01D 53/64; B01D 53/83; B01J 20/20; B01J 20/28004
See application file for complete search history.

(56) References Cited

U.S. PATENT DOCUMENTS 2,037,257 A 4/1936 Morrell
3,630,959 A 12/1971 Kiikka
(Continued)

FOREIGN PATENT DOCUMENTS

CA 1267881 4/1990
CN 101733072 A 6/2010
(Continued)

OTHER PUBLICATIONS

Sogaard et al., Development of a Reproducible Powder Characterization Method Using a Powder Rheometer, Annual transactions of the Nordic Rheology Society, 2012, pp. 239-245, vol. 20, Copenhagen, Denmark.
(Continued)

*Primary Examiner* — Christopher P Jones
(74) *Attorney, Agent, or Firm* — Sheridan Ross P.C.

(57) ABSTRACT

Sorbent compositions including sorbent particles of a small particle sized sorbent with increased pneumatic conveyance properties. The sorbent compositions have relatively small median particle size and have a controlled particle size distribution (PSD). Specifically, the sorbent compositions include a relatively small percentage of very fine particles, such as a small percentage of particles having a particle size of not greater than about 5 μm. The sorbent compositions are particularly useful for the treatment of a flue gas stream to remove mercury from the flue gas stream.

30 Claims, 4 Drawing Sheets

Related U.S. Application Data division of application No. 15/093,930, filed on Apr. 8, 2016, now Pat. No. 9,561,462, which is a division of application No. 14/201,398, filed on Mar. 7, 2014, now Pat. No. 9,314,767.

(51) Int. Cl.
*B01J 20/28* (2006.01)
*B01J 20/20* (2006.01)
*B01D 53/64* (2006.01)
*B01D 53/83* (2006.01)

(52) U.S. Cl.
CPC ... *B01J 20/28004* (2013.01); *B01D 2253/102* (2013.01); *B01D 2253/304* (2013.01); *B01D 2257/504* (2013.01); *B01D 2257/602* (2013.01)

(56) References Cited

U.S. PATENT DOCUMENTS

| | | |
|---|---|---|
| 3,736,040 A | 5/1973 | Zivi et al. |
| 5,240,474 A | 8/1993 | Auvil et al. |
| 5,691,294 A | 11/1997 | France et al. |
| 5,972,525 A | 10/1999 | Mori et al. |
| 6,065,330 A | 5/2000 | Freeman et al. |
| 6,068,674 A | 5/2000 | Dullien et al. |
| 6,117,810 A | 9/2000 | Lee et al. |
| 6,129,846 A | 10/2000 | Gadkaree |
| 6,391,373 B1 | 5/2002 | Kaiser et al. |
| 6,534,442 B1 | 3/2003 | Vaughn et al. |
| 6,712,898 B2 | 3/2004 | Palm et al. |
| 6,719,828 B1 | 4/2004 | Lovell et al. |
| 6,833,185 B2 | 12/2004 | Zhu et al. |
| 6,848,374 B2 | 2/2005 | Srinivasachar et al. |
| 7,112,272 B2 | 9/2006 | Hughes et al. |
| 7,112,280 B2 | 9/2006 | Hughes et al. |
| 7,648,932 B2 | 1/2010 | Weisensel et al. |
| 7,858,061 B2 | 12/2010 | Varma et al. |
| 8,080,088 B1 | 12/2011 | Srinivasachar |
| 8,329,614 B2 | 12/2012 | Chao et al. |
| 8,623,287 B2 | 1/2014 | Ramberg et al. |
| 9,314,767 B2 | 4/2016 | McMurray et al. |
| 9,399,191 B2 | 7/2016 | Xu et al. |
| 9,468,904 B2 | 10/2016 | McMurray et al. |
| 9,561,462 B2 | 2/2017 | McMurray et al. |
| 10,035,126 B2 | 7/2018 | McMurray et al. |
| 10,137,403 B2 | 11/2018 | McMurray et al. |
| 10,159,928 B2 | 12/2018 | McMurray et al. |
| 10,307,706 B2 | 6/2019 | Li et al. |
| 10,421,037 B2 | 9/2019 | Li et al. |
| 10,456,745 B2 | 10/2019 | Huston et al. |
| 2003/0110986 A1 | 6/2003 | Reddy et al. |
| 2005/0039598 A1 | 2/2005 | Srinivasachar et al. |
| 2005/0112056 A1 | 5/2005 | Hampden-Smith et al. |
| 2005/0163925 A1 | 7/2005 | Sacripante et al. |
| 2006/0186234 A1 | 8/2006 | Kerns et al. |
| 2006/0211571 A1 | 9/2006 | Iyer et al. |
| 2006/0249020 A1 | 11/2006 | Tonkovich et al. |
| 2007/0179056 A1 | 8/2007 | Baek et al. |
| 2009/0056538 A1 | 3/2009 | Srinivasachar et al. |
| 2009/0208397 A1 | 8/2009 | Levasseur et al. |
| 2009/0211500 A1 | 8/2009 | Andrus, Jr. et al. |
| 2009/0260541 A1 | 10/2009 | Kragten et al. |
| 2010/0004119 A1 | 1/2010 | Gadkaree et al. |
| 2010/0178624 A1 | 7/2010 | Srinivasachar |
| 2010/0202946 A1 | 8/2010 | Yang et al. |
| 2012/0160944 A1 | 6/2012 | Dodd et al. |
| 2012/0177923 A1 | 7/2012 | Kumara |
| 2012/0263801 A1 | 10/2012 | Code et al. |
| 2013/0109562 A1 | 5/2013 | Wong et al. |
| 2013/0272941 A1 | 10/2013 | Leung |
| 2014/0186625 A1 | 7/2014 | Wong et al. |
| 2014/0191157 A1 | 7/2014 | Wong et al. |
| 2015/0165416 A1 | 6/2015 | Wong et al. |
| 2015/0182942 A1 | 7/2015 | McMurray et al. |
| 2015/0235326 A1 | 8/2015 | Hansen et al. |
| 2015/0343378 A1 | 12/2015 | Huston et al. |
| 2016/0038871 A1 | 2/2016 | Li et al. |
| 2016/0214078 A1 | 7/2016 | Li et al. |
| 2016/0296908 A1 | 10/2016 | Li et al. |
| 2017/0043316 A1 | 2/2017 | Li et al. |
| 2017/0043321 A1 | 2/2017 | Li et al. |
| 2018/0001257 A1 | 1/2018 | Wong et al. |
| 2018/0028970 A1 | 2/2018 | Huston et al. |
| 2018/0029006 A1 | 2/2018 | Li et al. |
| 2018/0029008 A1 | 2/2018 | Li et al. |
| 2018/0029009 A1 | 2/2018 | Li et al. |
| 2018/0170773 A1 | 6/2018 | Mitchek et al. |
| 2019/0291041 A1 | 9/2019 | McMurray et al. |
| 2020/0001228 A1 | 1/2020 | Li et al. |
| 2020/0047107 A1 | 2/2020 | Cayton |

FOREIGN PATENT DOCUMENTS

| | | |
|---|---|---|
| EP | 1773526 B1 | 2/2011 |
| WO | 2006099291 A2 | 9/2006 |
| WO | 2013063490 A1 | 5/2013 |
| WO | 2013082157 A1 | 6/2013 |
| WO | 2013082856 A1 | 6/2013 |
| WO | 2014106131 A1 | 7/2014 |

OTHER PUBLICATIONS

Freeman, New Insights into Powder Flowability, Innovations in Food Technology, pp. 1-5 (Dec. 2001).
Freeman Technology Information Pamphlet, Measuring the Flow Properties of Powders, pp. 1-6 (Date Unknown).
Freeman Technology Information Pamphlet, Measuring and Understanding the Flow Properties of Powders with FT4 Powder Rheometer, pp. 1-8 (Date Unknown).
Bodhmage, "Correlation between physical properties and flowability indicators for fine powders," Thesis submitted to the University of Saskatchewan (Jul. 2006).
Deng, "Sorbent Technology," Encyclopedia of Chemical Processsing, pp. 2825-2845 (2006).
"Advantage Note—Bond Elut Plexa Solid-phase Extraction Products," Varian, Inc./Agilent Technologies (2009).
Kong et al.; Dry Sorbent Injection of Sodium Sorbents for SO2; HCI and Mercury Mitigation; NAWTEC18-3560; Proceedings fo the 18th Annual North American Waste-to-Energy Conference; May 11-13, 2010; 4 pp.
"Application Report—Morphological Parameters Used," Malvern Instruments (2012).
Kong et al.; "Dry Injection of Sodium Sorbents for Air Pollution Control"; Environmental Engineer; Spring 2011; pp. 20-23.
Ryu et al., "Development of Na and K-Based Sorbents for CO2 Capture from Flue Gas," Conference Proceedings—Fourth Annual Conference on Carbon Capture and Sequestration (May 2-5, 2005).
Schulze, "Flow Properties of Powders and Bulk Solids," (2011).
VanDerWerff, "Flow dry bulk sorbent injection effectively removes stack gas pollutants," Air Pollution Control, CSC Publishing Inc. (date unknown).
Office Action (Restriction Requirement) dated Nov. 24, 2015 for U.S. Appl. No. 14/145,731.
Office Action (Ex Parte Quayle) dated May 11, 2016 for U.S. Appl. No. 14/145,731.
Notice of Allowance dated Aug. 15, 2016 for U.S. Appl. No. 14/145,731.
Office Action dated Aug. 4, 2017 for U.S. Appl. No. 14/932,318.
Notice of Allowance dated Apr. 2, 2018 for U.S. Appl. No. 14/932,318.
Office Action dated Aug. 17, 2017 for U.S. Appl. No. 15/295,665.
Notice of Allowance dated Mar. 27, 2018 for U.S. Appl. No. 15/295,665.
Notice of Allowance dated Jul. 30, 2018 for U.S. Appl. No. 15/295,665.
Office Action (Restriction Requirement) dated Mar. 24, 2015 for U.S. Appl. No. 14/201,398.
Office Action dated Jul. 15, 2015 for U.S. Appl. No. 14/201,398.

(56) References Cited

OTHER PUBLICATIONS

Notice of Allowance dated Feb. 25, 2016 for U.S. Appl. No. 14/201,398.
Office Action dated May 23, 2016 for U.S. Appl. No. 15/093,930.
Notice of Allowance dated Sep. 27, 2016 for U.S. Appl. No. 15/093,930.
Office Action dated Sep. 18, 2017 for U.S. Appl. No. 15/426,627.
Notice of Allowance dated Apr. 18, 2018 for U.S. Appl. No. 15/426,627.
Notice of Allowance dated Aug. 15, 2018 for U.S. Appl. No. 15/426,627.
U.S. Appl. No. 16/657,634, filed Oct. 18, 2019, Huston et al.
U.S. Appl. No. 16/725,993, filed Dec. 23, 2019, Huston et al.
Notice of Allowance dated Sep. 27, 2016 for U.S. Appl. No. 15/093,930, 7 pages.

SORBENT COMPOSITIONS HAVING PNEUMATIC CONVEYANCE CAPABILITIES

CROSS-REFERENCE TO RELATED APPLICATIONS

This application claims the priority benefit as a continuation of U.S. patent application Ser. No. 15/426,627, filed on Feb. 7, 2017, now U.S. Pat. No. 10,159,928, issued on Dec. 25, 2018, which is a divisional application of U.S. patent application Ser. No. 15/093,930, filed on Apr. 8, 2016, now U.S. Pat. No. 9,561,462, issued on Feb. 7, 2017, which is a divisional application of U.S. patent application Ser. No. 14/201,398, filed on Mar. 7, 2014, now U.S. Pat. No. 9,314,767, issued on Apr. 19, 2016, each of which is incorporated herein by reference in it is entirety.

FIELD

This disclosure relates to the field of particulate sorbent compositions, and in particular to carbonaceous sorbent compositions such as powdered activated carbon compositions having improved pneumatic conveyance capabilities.

BACKGROUND

Powdered activated carbon ("PAC") is a highly amorphous form of carbon having an average particle size of about −80 mesh (e.g., not greater than about 177 μm). PAC is manufactured to have a high porosity, a small average pore size and a high surface area, and is able to bind (e.g., adsorb) many contaminant species from another substance, thereby purifying (e.g., decontaminating) the other substance.

Industrial applications of PAC include, but are not limited to, waste water treatment, food purification, and the treatment of flue gas from a boiler (e.g., a coal boiler) to remove contaminants such as mercury from the flue gas. For many such industrial applications, PAC is shipped in bulk to an end user, such as by using trucks, rail shipment, or the like. The PAC is unloaded from the truck or rail car and may be placed subsequently in a storage unit (e.g., a storage silo). When the PAC is needed, it is then conveyed to the point of use, e.g., to a water treatment process or to a flue gas treatment process.

Often, the PAC is pneumatically conveyed such as from a rail car to a storage unit, from a rail car to a transportation truck, from a transportation truck to a storage unit, and/or from the storage unit to the point of use. Pneumatic conveyance of PAC involves conveying the PAC through an enclosed pipeline using a pressure differential and the flow of a gas (e.g., air) to suspend and move the PAC along the pipeline. Typically, the PAC is conveyed in a dilute phase, i.e., where the conveying system relies on the gas velocity to pick up and entrain the particles. Pneumatic conveyance of PAC has many advantages over other conveyance techniques. For example, pneumatic conveyance pipelines can be arranged with bends to circumvent other equipment, and the system has few moving parts and is completely enclosed.

SUMMARY

Recently, it has been found that for some applications, and for the treatment of flue gas streams in particular, particulate carbonaceous sorbent compositions (e.g., PAC-containing) having a reduced average particle size may be advantageous for the capture of contaminants such as mercury (Hg) from a flue gas stream. In particular, sorbent compositions that include PAC, having a relatively small average particle size, such as a median particle size (D50) of about 15 μm or less, may be advantageous for the removal of mercury from a flue gas stream.

However, it has been found that some PAC-containing sorbent compositions having a relatively small average particle size may be susceptible to flow interruptions and/or pressure fluctuations when being pneumatically conveyed in some situations, such as when being conveyed from a storage unit to the point of use (e.g., to the lances that inject the PAC-containing sorbent composition into the flue gas stream). Specifically, it has been found that the conveyance system may experience pressure spikes which can result in feeder and/or blower shut down for a period of time. Such shut downs may result in an interruption of the PAC flow to the flue gas stream and may lead to mercury emission problems. A need has been identified for a sorbent composition containing a particulate sorbent such as PAC having a relatively small median particle size and with good pneumatic conveyance properties, i.e., to reduce instabilities and interruptions during pneumatic conveyance of the sorbent composition.

It is one objective of the present disclosure to mitigate the problem of poor pneumatic conveyance of small sized particles, especially sorbents such as PAC. In one embodiment, a particulate sorbent composition is provided which overcomes the limitations of pneumatic conveyance of some smaller median particle size PACs, i.e., with median particle size of about 20 μm or less, such as 15 μm or less. It has been found that the presence of large numbers of very fine particles, i.e., particles with a particle size (diameter) of about 5 μm or less, may be related to the pneumatic conveyance issues sometimes experienced by the power plants. Typically, a batch of PAC with a D50 of about 20 μm or less has a significant percentage of such very fine particles, such as greater than about 17 vol. % of such fine particles. It has been found that controlling the percentage of such fine particles, e.g., by removing very fine particles and/or otherwise sizing (e.g., classifying) the sorbent composition to reduce the number of very fine particles may enable improved pneumatic transport capability.

In one embodiment, a particulate sorbent composition is provided that includes porous carbonaceous particles, wherein the particulate sorbent composition has a median particle size of not greater than about 20 μm, and has a particle size distribution wherein not greater than about 10 vol. % of particles comprising the particulate sorbent composition have a particle size of not greater than about 5 μm.

In one characterization, the particulate sorbent composition has well-controlled median particle size, such as not greater than about 18 μm, not greater than about 15 μm, not greater than about 14 μm, or even not greater than about 12 μm.

To enhance the pneumatic flow properties of sorbent compositions having such a small median particle size, the concentration of very fine-sized particles in the composition is relatively low. In one characterization, not greater than about 5 vol. % of the particles comprising the particulate sorbent composition have a particle size of not greater than about 5 μm.

The concentration of particles having a size of not greater than about 4 μm may also be controlled. In one characterization, not greater than about 10 vol. % of the particles comprising the particulate sorbent composition have a particle size of not greater than about 4 μm. In yet another characterization, not greater than about 5 vol. % of the particles comprising the particulate sorbent composition have a particle size of not greater than about 4 μm.

The concentration of particles having a particle size of not greater than 3 μm may also be controlled. In one characterization, not greater than about 8 vol. % of the particles comprising the particulate sorbent composition have a particle size of not greater than about 3 μm, and in another characterization, not greater than about 4 vol. % of the particles comprising the particulate sorbent composition have a particle size of not greater than about 3 μm.

The concentration of particles having a particle size of not greater than 2 μm may also be controlled. In one characterization, not greater than about 5 vol. % of the particles comprising the particulate sorbent composition have a particle size of not greater than about 2 μm, such as where not greater than about 3 vol. % of the particles comprising the particulate sorbent composition have a particle size of not greater than about 2 μm.

The concentration of particles having a particle size of not greater than 1 μm may also be controlled. In one characterization, the not greater than about 2 vol. % of the particles comprising the particulate sorbent composition have a particle size of not greater than about 1 μm, such as where not greater than about 1 vol. % of the particles comprising the particulate sorbent composition have a particle size of not greater than about 1 μm.

In another characterization, the porous carbonaceous particles of the particulate sorbent composition are selected from the group consisting of activated carbon, reactivated carbon, carbonaceous char and combinations thereof. In a particular characterization, the porous carbonaceous particles comprise powdered activated carbon. For example, the powdered activated carbon may be derived from lignite coal.

The particulate sorbent compositions disclosed herein may have improved pneumatic conveyance properties, e.g., as compared to similar sorbent compositions having a higher concentration of fine-sized particles. The improved pneumatic conveyance properties may be described using one or more powder flow characteristics that may be measured and quantified such as by using a powder rheometer. For example, the particulate sorbent composition may have a Basic Flow Energy of at least about 300 mJ, such as a Basic Flow Energy of at least about 350 mJ, or even a Basic Flow Energy of at least about 400 mJ.

In another characterization, the particulate sorbent composition may have a Specific Energy of at least about 6 mJ/g, such as a Specific Energy of at least about 6.5 mJ/g.

In yet another characterization, the particulate sorbent composition may have an Aeration Energy of not greater than about 54 mJ, such as an Aeration Energy not greater than about 20 mJ or even an Aeration Energy of not greater than about 10 mJ.

In another characterization, the particulate sorbent composition has an Aeration Ratio of at least about 9, such as an Aeration Ratio of at least about 20, such as an Aeration Ratio of at least about 30, or even an Aeration Ratio of at least about 40.

In another characterization, the particulate sorbent composition comprises powdered activated carbon derived from lignite coal and has a Conditioned Bulk Density of at least about 0.4 g/ml, such as a Conditioned Bulk Density of at least about 0.46 g/ml, or even a Conditioned Bulk Density of at least about 0.48 g/ml.

In another characterization, the particulate sorbent composition has a pressure drop as measured by the Permeability test of not greater than about 55 mbar at an applied normal stress of 15 kPa and at an air velocity of 0.5 mm/s. For example, the pressure drop as measured by the Permeability test may be not greater than about 40 mbar at an applied normal stress of 15 kPa and at an air velocity of 0.5 mm/s. In another example, the pressure drop as measured by the Permeability test is not greater than about 30 mbar at an applied normal stress of 15 kPa and at an air velocity of 0.5 mm/s, such as a pressure drop as measured by the Permeability test of not greater than about 25 mbar at an applied normal stress of 15 kPa and at an air velocity of 0.5 mm/s. In one particular characterization, the pressure drop as measured by the Permeability test is not greater than about 20 mbar at an applied normal stress of 15 kPa and at an air velocity of 0.5 mm/s.

Another way to characterize the pneumatic flow properties is by measuring the Compressibility of the particulate sorbent composition. In one characterization, the particulate sorbent composition has a Compressibility of not greater than about 24% at an applied normal stress of 15 kPa. In another characterization, the particulate sorbent composition has a Compressibility of not greater than about 20% at an applied normal stress of 15 kPa. In a further characterization, the particulate sorbent composition has a Compressibility of not greater than about 14% at an applied normal stress of 15 kPa.

The present disclosure also provides for methods for the treatment of a flue gas stream emanating from a boiler, comprising the step of contacting the flue gas stream with a particulate sorbent composition according to any of the foregoing embodiments and characterizations.

In another embodiment, a method for the manufacture of a particulate sorbent composition is provided. The method may include the step of comminuting an intermediate particulate carbonaceous material to form a comminuted particulate carbonaceous material, the comminuted particulate carbonaceous material having a median particle size of not greater than about 30 μm and a having a particle size distribution wherein greater than 10 vol. % of particles comprising the comminuted particulate carbonaceous material have a particle size of not greater than 5 μm. The method may further include the step of sizing the comminuted particulate carbonaceous material to produce a size-controlled particulate sorbent composition having a median particle size of not greater than about 30 μm and a particle size distribution wherein not greater than about 10 vol. % of particles comprising the size-controlled particulate sorbent composition have a particle size of less than about 5 μm.

In certain characterizations of this embodiment, the intermediate particulate carbonaceous material comprises powdered activated carbon. For example, the intermediate particulate carbonaceous material may be formed by activating a carbon feedstock to form the powdered activated carbon.

In another characterization, the size-controlled particulate sorbent composition has a median particle size of not greater than about 25 μm, such as a median particle size of not greater than about 20 μm, such as a median particle size of not greater than about 18 μm, or even a median particle size of not greater than about 15 μm.

In certain characterizations, the sizing step includes removing from the comminuted particulate sorbent composition at least a portion of the particles comprising the comminuted particulate sorbent composition having a particle size of less than 5 μm. For example, the removing step may include removing the portion of the particles comprising the comminuted particulate sorbent composition having a particle size of less than 5 μm using an air classifier.

In another characterization, the sizing step may include agglomerating at least a portion of the particles comprising the comminuted particulate sorbent composition having a particle size of less than 5 μm.

In another characterization, not greater than about 10 vol. % of the particles in the size-controlled particulate sorbent composition have a particle size of not greater than about 5 μm. In yet another characterization, not greater than about 5 vol. % of the particles in the size-controlled particulate sorbent composition have a particle size of not greater than about 5 μm. In yet a further characterization, not greater than about 2 vol. % of the particles in the size-controlled particulate sorbent composition have a particle size of not greater than about 1 μm.

The enhanced pneumatic flow characteristics of the size-controlled particulate sorbent composition may be characterized by a change in measurable flow properties of the composition. In one characterization, the Conditioned Bulk Density of the size-controlled particulate sorbent composition is greater than the Conditioned Bulk Density of the comminuted particulate carbonaceous material. In a particular characterization, the Conditioned Bulk Density of the size-controlled particulate sorbent composition is at least about 5% greater than the Conditioned Bulk Density of the comminuted particulate carbonaceous material. In yet another characterization, the Conditioned Bulk Density of the size-controlled particulate sorbent composition is at least about 10% greater than the Conditioned Bulk Density of the comminuted particulate carbonaceous material.

DETAILED DESCRIPTION

Various embodiments of a particulate sorbent composition are disclosed herein that have controlled particle size characteristics and that demonstrate improved pneumatic conveyance characteristics as compared to similar sorbent compositions where the particle size characteristics are not carefully controlled.

In this regard, the particulate sorbent composition may have a median particle size of not greater than about 30 μm, such as not greater than about 20 μm, and a PSD wherein a relatively small volume percentage (vol. %) of very fine particles, e.g., a relatively small vol. % of particles having a size of not greater than about 5 μm, such as not greater than about 15 vol. %, or even not greater than about 10 vol. %. Such a size-controlled particulate sorbent composition may be produced inherently in the manufacturing process or may be formed in a subsequent classification process, for example where at least a portion of the very fine-sized particles are removed, or alternately agglomerated. The particulate sorbent composition may be characterized as having certain quantifiable flow properties within desirable ranges, such as Basic Flow Energy, Specific Energy, Conditioned Bulk Density, Aeration Energy, Aeration Ratio, Compressibility, and pressure drop, as measured in a Permeability test, the desired ranges being indicative of good pneumatic conveyance properties.

When a combustible material containing fixed carbon and volatile matter (e.g., coal or municipal waste) is combusted in a boiler (e.g., for the generation of electricity using a steam turbine), a flue gas is formed that includes contaminants that originate from the combustible material. Such contaminants may include mercury (Hg), e.g., in concentrations of from about 1 ppbw to 100 ppbw (parts per billion by weight). Environmental regulations limit the concentration of mercury in the flue gas that can be vented to the atmosphere. One method to capture mercury from the flue gas is to contact the flue gas with a sorbent such as PAC, e.g., by injecting PAC into the flue gas stream. Sorbents such as PAC are known to effectively remove heavy metals such as mercury from such fluid streams.

Figure 1:
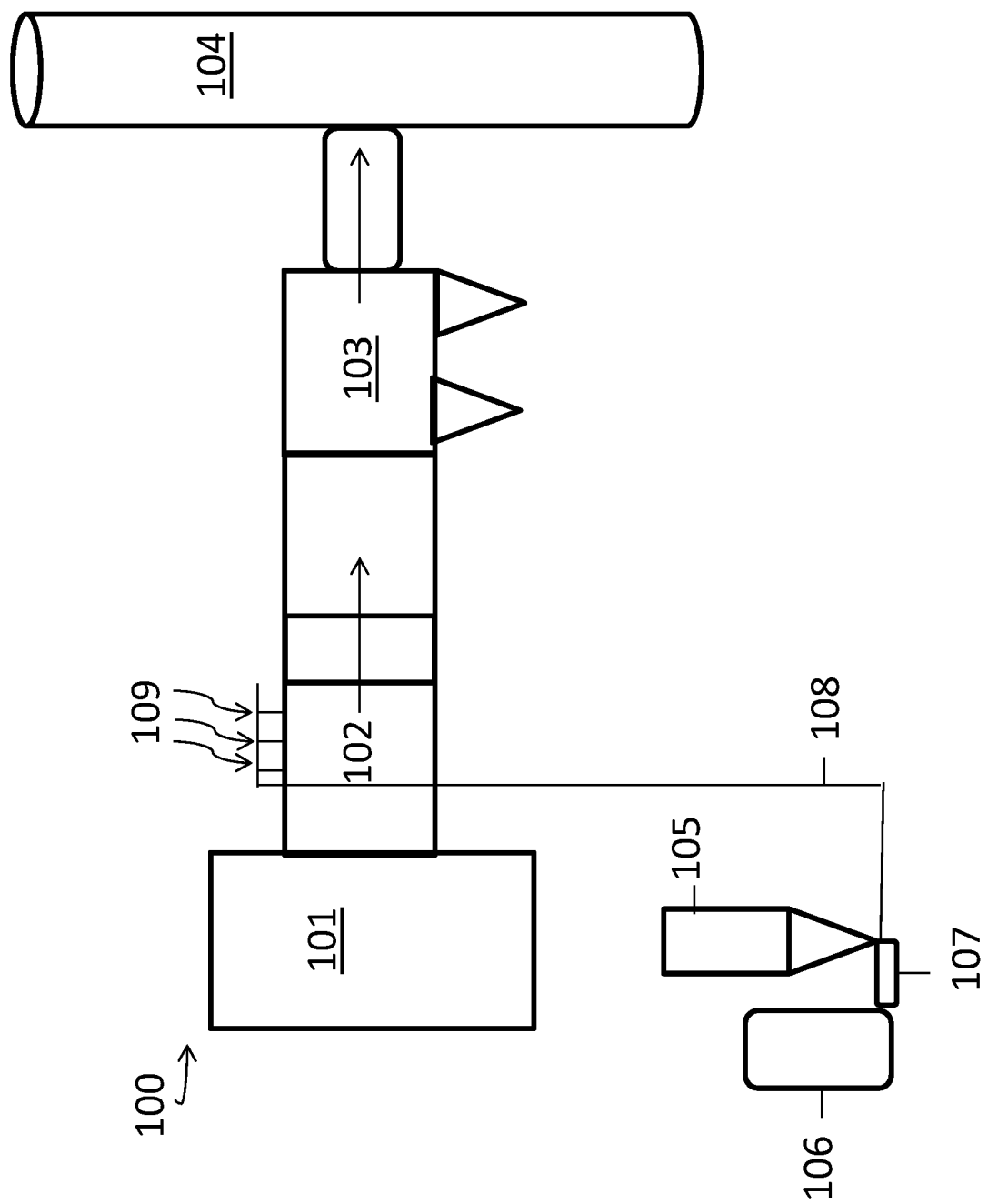
FIG. 1 is a schematic illustration of a system and method for pneumatically transporting and introducing PAC into a flue gas stream at an electric generating unit (EGU) or industrial boiler site.

FIG. 1 schematically illustrates a system 100 and method for pneumatically transporting and introducing a particulate sorbent composition into a flue gas stream 102 at a power plant or industrial boiler site, such as a coal-burning facility. A boiler 101 is configured to burn coal and/or another material (e.g., municipal waste). The burning of coal in the boiler 101 creates a flue gas stream 102 that may include various components including gases (e.g., $N_2$, $CO_2$, $O_2$, $NO_x$, $SO_x$, etc.) and particulates (e.g., fly ash). The flue gas stream 102 typically also includes heavy metals such as Hg that must be removed from the flue gas stream 102 before exiting the stack 104. In this regard, sorbent compositions such as PAC may be injected into the flue gas stream 102 to capture (e.g., sequester) mercury.

The particulate sorbent composition may be stored in a silo or hopper 105 prior to introduction to the flue gas stream 102. A blower 106 forces air through an eductor 107 creating a venturi effect dispersing the particulate sorbent composition into a conveyance line 108 and through injection lances 109 into the flue gas stream 102. Further, a screw feeder (not shown) may transport the particulate sorbent composition from the silo or hopper 105 to the eductor 107. After contacting the flue gas stream 102 with the particulate sorbent composition, the flue gas stream may be introduced to a particulate matter separation unit 103 to remove particulates (e.g., the particulate sorbent composition and fly ash) before exiting the stack 104. This particulate matter separation unit 103 may be, for example, an electrostatic precipitator. It will be appreciated by those skilled in the art that the plant may include other devices not illustrated in FIG. 1, such as a selective catalytic reduction unit (SCR), an air preheater and the like, and may have numerous other configurations.

The particulate sorbent compositions disclosed herein may have improved pneumatic conveyance properties to enhance the transport of the sorbent compositions, such as through a conveyance line 108. The particulate sorbent compositions have controlled particle size characteristics, such as where the vol. % of the particles in the compositions having a very fine particle size (e.g., less than 5 μm) is reduced as compared to known particulate sorbent compositions.

The sorbent compositions disclosed herein are selected for their ability to sequester contaminants from a fluid stream, for example for sequestering heavy metals such as Hg from a flue gas stream. Useful particulate sorbent compositions will typically comprise particles that are highly porous and have a high surface area. For example, the particulate sorbent may comprise porous carbonaceous particles, zeolite particles, silica particles (including silica gel), alumina particles, clay particles (e.g., aluminosilicates) or combinations thereof. In a particular embodiment, the sorbent composition includes porous carbonaceous particles. Examples of porous carbonaceous particles include PAC, reactivated carbon, carbonaceous char, and combinations thereof. In one particular characterization, the sorbent composition will include PAC. In this regard, although the following discussion primarily refers to the use of porous carbonaceous particles in the sorbent material, specifically PAC, the sorbent compositions of the present disclosure are not so limited. The PAC may be derived from a variety of sources (e.g., feedstocks), including anthracite coal, lignite coal, coconut shells, wood, and the like. In one characterization, the PAC is derived from a lignite coal feedstock, which generally has a higher mineral ash content than PAC derived from anthracite coal.

The particulate sorbent composition may have a relatively small median (D50) particle size, such as a median particle size of not greater than about 30 µm. A smaller median particle size may be useful for many applications, such as for the treatment of a flue gas to remove mercury. In one characterization, the median particle size of the particulate sorbent composition may be not greater than about 25 µm, such as not greater than about 20 µm, not greater than about 18 µm, or even not greater than about 15 µm. Due to potential material handling issues, the median particle size of the particulate sorbent composition may also be at least about 4 µm, such as at least about 6 µm, at least about 8 µm or even at least about 10 µm. In one particular characterization, the median particle size of the particulate sorbent composition is at least about 8 µm and is not greater than about 15 µm.

As is discussed above, it has been found that in addition to a relatively small median particle size, the particle size distribution (PSD) of the particulate sorbent composition should also be well-controlled, particularly with regard to particles at the lower end of the size distribution. Such a controlled PSD may be characterized in a number of ways. In one characterization, the percentage (e.g., vol. %) of particles in the sorbent composition having a size (diameter) of not greater than about 5 µm is not greater than a maximum vol. % of the particles comprising the sorbent composition. For example, not greater than about 15 vol. % of the particles comprising the sorbent composition may have a particle size of not greater than about 5 µm, such as not greater than about 10 vol. %, not greater than about 5 vol. %, or even not greater than about 3 vol. %.

In another characterization of the sorbent compositions disclosed herein, the vol. % of particles comprising the particulate sorbent composition having a size of not greater than about 4 µm is not greater than a maximum vol. %. For example, not greater than about 10 vol. % of the particles comprising the particulate sorbent composition may have a particle size of not greater than about 4 µm, such as not greater than about 5 vol. %, or even not greater than about 3 vol. %. In another characterization, the vol. % of particles comprising the particulate sorbent composition having a size of not greater than about 3 µm is not greater than a maximum vol. %. For example, not greater than about 8 vol. % of the particles comprising the particulate sorbent composition may have a particle size of not greater than about 3 µm, such as not greater than about 4 vol. %, or even not greater than about 2 vol. %. In another characterization, the vol. % of particles comprising the particulate sorbent composition having a size of not greater than about 2 µm is not greater than a maximum vol. %. For example, not greater than about 5 vol. % of the particles comprising the particulate sorbent composition may have a particle size of not greater than 2 µm, such as not greater than about 3 vol. % or even not greater than about 1 vol. %. In another characterization of the sorbent composition, the vol. % of particles comprising the particulate sorbent composition having a size of not greater than about 1 µm is not greater than a maximum vol. %. For example, not greater than about 2 vol. % of the particles comprising the particulate sorbent composition may have a particle size of not greater than about 1 µm, such as not greater than about 1 vol. %, or even not greater than about 0.5 vol. %.

Characterized another way, the vol. % of particles comprising the particulate sorbent composition having a size of at least about 5 µm is greater than a minimum vol. % of the particles. For example, at least about 85 vol. % of the particles comprising the particulate sorbent composition may have a particle size of at least about 5 µm, such as at least about 90 vol. %, at least about 95 vol. %, or even at least about 97 vol. %. In another characterization, the vol. % of particles having a size of at least about 4 µm is greater than a minimum vol. % of the particles comprising the particulate sorbent composition. For example, at least about 90 vol. % of the particles comprising the particulate sorbent composition may have a particle size of at least 4 µm, such as at least about 95 vol. %, or even at least about 97 vol. %. In another characterization, the vol. % of particles comprising the particulate sorbent composition having a size of at least 3 µm is greater than a minimum vol. % of the particles. For example, at least about 92 vol. % of particles comprising the particulate sorbent composition may have a particle size of at least 3 µm, such as at least about 96 vol. %, or even at least about 98 vol. %. In another characterization, the vol. % of particles comprising the particulate sorbent composition having a size of at least about 2 µm is greater than a minimum vol. % of the particles. For example, at least about 95 vol. % of the particles comprising the particulate sorbent composition may have a particle size of at least about 2 µm, such as at least about 97 vol. %, or even at least about 99 vol. %. In yet another characterization, the vol. % of the particles comprising the particulate sorbent composition having a size of at least 1 µm is greater than a minimum vol. % of the particles. For example, at least about 98 vol. %, such as at least about 99 vol. %, or even at least about 99.5 vol. % of the particles comprising the particulate sorbent composition may have a particle size of at least about 1 µm.

The particulate sorbent composition can also be characterized as having a relatively narrow PSD. In this regard, the PSD may be characterized as having a median particle size, where the percentage of particles within a range around the median particle size is relatively high. For example, the PSD of the particulate sorbent composition may be characterized as having a median particle size in the range of from about 6 µm to about 15 µm, where the D95 value (i.e., the particle size below which 95 vol. % of the particles fall) is not greater than about 30 µm, such as not greater than about 28 µm. In another characterization, the D5 value (i.e., the particle size above which 95 vol. % of the particles fall) is at least about 3 µm, such as at least about 5 µm.

Median particle size and PSD of the sorbent compositions can be measured, for example, by using a Micrometrics Saturn DigiSizer II (Micrometrics Instrument Corporation, Norcross, Ga.), which is a high-definition digital particle size analyzer. This instrument employs a light scattering analysis technique that utilizes advanced digital detection technology.

Figure 2:
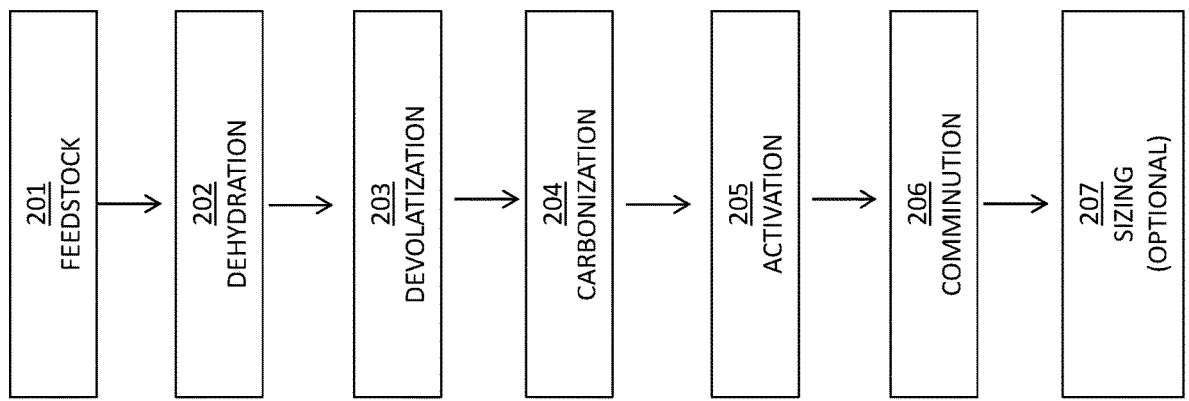
FIG. 2 illustrates a flow sheet for the manufacture of a particulate sorbent composition in accordance with an embodiment of the present disclosure.

Particulate sorbent compositions having the foregoing particle size characteristics can be manufactured by controlling the manufacturing process to reduce the formation of very fine particles, and/or by sizing (e.g., classifying or agglomerating) the particulate sorbent material, e.g., by separating particles of a very fine size from the larger particles. FIG. 2 is a flow sheet that illustrates an exemplary method for the manufacture of a particulate sorbent composition that includes a particulate carbonaceous material, namely PAC. The manufacturing process begins with a carbonaceous feedstock 201 such as coal, e.g., lignite coal. In the manufacturing process, the feedstock 201 is subjected to an elevated temperature and one or more oxidizing gases under exothermic conditions for a period of time to activate the feedstock 201. The specific steps in the process include: (1) dehydration 202, where the feedstock 201 is heated to remove the free and bound water, typically occurring at temperatures ranging from 100° C. to 150° C.; (2) devolatilization 203, where free and weakly bound volatile organic constituents are removed, typically occurring at temperatures above 150° C.; (3) carbonization 204, where non-carbon elements continue to be removed and elemental carbon is concentrated and transformed into random amorphous structures, typically occurring at temperatures ranging from 350° C. to 800° C.; and (4) activation 205, where steam, air, or another oxidizing agent is added and pores are developed, typically occurring at temperatures above 800° C. The manufacturing process may be carried out, for example, in a multi-hearth or rotary furnace. The manufacturing process is not necessarily discrete and any two or more of the foregoing steps can overlap and/or can use various temperatures, gases, and residence times within each step to promote desired surface chemistry and physical characteristics of the manufactured intermediate particulate carbonaceous material.

After activation 205, the intermediate particulate carbonaceous material typically contains many agglomerates and typically has a median particle size that is too large to be used in many sorbent applications, such as for the treatment of a flue gas. In this regard, the intermediate particulate carbonaceous material may be subjected to a comminution step 206 to reduce the particle size (e.g., the median particle size) of the intermediate particulate carbonaceous material and form a comminuted particulate carbonaceous material having a desired median particle size. Comminution 206 may occur, for example, in a mill such as a roll mill, jet mill, classifier mill, or other like device. Typically, comminution 206 of the intermediate particulate carbonaceous material is carried out under conditions (e.g., for a period of time) to form a comminuted particulate carbonaceous material having a median particle size of not greater than about 30 μm. In one characterization, the comminuting step is carried out under conditions such that the comminuted particulate carbonaceous material has a median particle size of not greater than about 25 μm, such as not greater than about 20 μm, not greater than about 18 μm, or even not greater than about 15 μm.

However, typical comminution methods also lead to the formation of a relatively high percentage of particles having a very small particle size. For example, greater than 10 vol. %, such as greater than 15 vol. % or even greater than 20 vol. % of the comminuted particles from the comminution step 206 may have a particle size of not greater than 5 μm. As is discussed above, such concentrations of very fine-sized particles may inhibit the pneumatic flow of sorbent compositions containing the particles.

In one characterization, the comminution step 206 may be controlled to reduce the formation of particles having a very fine particle size (e.g., not greater than about 5 μm). Alternatively, or in addition to such control, the manufacturing process (e.g., prior to comminution) may be controlled to yield an end product having the desired particle size properties, such as by controlling the particle size properties of the initial feedstock 201.

In the event that manufacturing conditions result in a greater number of very fine-sized particles than is desired, a sizing step 207 may be carried out to reduce the concentration of such very fine particles in the comminuted particulate sorbent composition. For example, the comminuted particulate carbonaceous material may be subjected to a sizing step 207 that includes selectively agglomerating at least a portion of the fine-sized particles to form larger sized particles, thereby reducing the concentration of fine-sized particles. For example, the selective agglomeration step may include the selective agglomeration of particles having a particle size of less than about 5 μm.

In another characterization, the sizing step 207 may include removing from the comminuted particulate sorbent composition at least a portion of the fine-sized particles. For example, the sizing step 207 may include removing at least a portion of particles having a particle size of less than 3 μm, such as by removing at least a portion of particles having a particle size of less than 4 μm or even less than 5 μm. The selective removal of such particles may be carried out using an air classifier, screen/mesh classification (e.g., vibrating screens), or centrifugation, for example.

In either event, the sizing step 207 may be carried out to form particulate sorbent composition (e.g., a size-controlled particulate sorbent composition) having the particle size characteristics described above.

The sorbent compositions described herein may further include other additives to enhance the efficacy of the sorbent compositions in a selected application, such as for the treatment of a flue gas stream to remove mercury. Examples of such additives include, but are not limited to, oxidizing agents, acid gas agents, and flow agents.

By way of example, the sorbent compositions may include one or more oxidizing agents that may improve the adsorption of mercury from a flue gas stream. Oxidizing agents may include halogen salts such as inorganic halogen salts, which may include bromine compounds such as bromides, bromates or hypobromites, iodine compounds such as iodides, iodates or hypoiodites, or chlorine compounds such as chlorides, chlorates or hypochlorites. The inorganic halogen salt may be an alkali metal or an alkaline earth element containing halogen salt where the inorganic halogen salt is associated with an alkali metal such as lithium, sodium, and potassium or alkaline earth metal such as magnesium, and calcium. Non-limiting examples of inorganic halogen salts include alkali metal and alkali earth metal counterions, such as calcium hypochlorite, calcium hypobromite, calcium hypoiodite, calcium chloride, calcium bromide, calcium iodide, magnesium chloride, magnesium bromide, magnesium iodide, sodium chloride, sodium bromide, sodium iodide, potassium tri-chloride, potassium tri-bromide, potassium tri-iodide, and the like. The oxidizing agents may be included in the composition at any concentration, and in some embodiments, no oxidizing agent may be included in the compositions embodied by the invention.

In some embodiments, the sorbent composition may include an acid gas agent such as, for example, an alkaline compound. Numerous alkaline agents are known in the art and currently used to remove sulfur oxide species from flue gas and any such alkaline agent may be used in the invention. For example, in various embodiments, the alkaline additive may be alkali oxides, alkaline earth oxides, hydroxides, carbonates, bicarbonates, phosphates, silicates, aluminates, and combinations thereof, and in certain embodiments, the alkaline agent may be calcium carbonate ($CaCO_3$), calcium oxide (CaO), calcium hydroxide ($Ca(OH)_2$); magnesium carbonate ($MgCO_3$); magnesium hydroxide ($Mg(OH)_2$) magnesium oxide (MgO), sodium carbonate ($Na_2CO_3$), sodium bicarbonate ($NaHCO_3$), trisodium hydrogendicarbonate dihydrate ($Na_3(CO_3)(HCO_3).2H_2O$), and combinations thereof.

In one particular example, the acid gas agent is a trivalent or higher Group 3 to Group 14 metal-containing compound selected from the group consisting of a carbonate, an oxide, a hydroxide, an ionic salt precursor to a hydroxide and combinations thereof. For example, the trivalent or higher metal may be selected from Group 13 to Group 14 metals, and in certain characterizations the trivalent or higher metal is a Group 13 metal. For example, the trivalent or higher metal may be aluminum. In other characterizations, the trivalent or higher metal may be tin. The metal-containing compound may comprise an anion and a cation, where the cation includes the trivalent or higher metal. The metal-containing compound may also be a metal oxide, for example $SnO_2$. The metal-containing compound may also be a metal hydroxide, such as aluminum hydroxide. The metal-containing compound may also be an ionic salt precursor to a metal hydroxide, such as an ionic salt that includes a polyatomic anion where the trivalent or higher Group 3 to Group 14 metal is a component of the polyatomic anion. The polyatomic anion may be an oxoanion and the metal may be aluminum. For example, the ionic salt may be sodium aluminate or sodium stannate. Such acid gas agents are disclosed in more detail in commonly-owned U.S. patent application Ser. No. 14/142,636 by Wong et al., which is incorporated herein by reference in its entirety.

The sorbent compositions disclosed herein may also include flow agents to further enhance the flow properties of the sorbent composition. Examples include, but are not limited to, flake-like particles such as phyllosilicate minerals (e.g., mica or talc) or graphite. Such flow agents are disclosed in more detail in commonly-owned U.S. patent application Ser. No. 14/145,731 by McMurray et al., which is incorporated herein by reference in its entirety. Other examples of flow agents include precipitated silica.

As is noted above, the sorbent compositions disclosed herein may have improved pneumatic conveyance properties as compared to known sorbent compositions, particularly when the sorbent composition (e.g., the PAC) has a small median particle size (e.g., about 20 µm or less). To quantify this result, various powder characteristics can be quantitatively measured to indicate such improvements, including Basic Flow Energy ("BFE"), Specific Energy ("SE"), Conditioned Bulk Density ("CBD"), Aeration Energy ("AE"), Aeration Ratio ("AR"), pressure drop, as measured in a Permeability test, and/or Compressibility of the sorbent composition.

These powder characteristics can be measured using a powder rheometer, for example using a Freeman Technology 4 ("FT4") Powder Rheometer, available from Freeman Technology (Worcestershire, United Kingdom). The FT4 Powder Rheometer is capable of quantitatively measuring the flowability characteristics of particulate compositions, and these measurements can be utilized to predict the characteristics of the particulate composition when being pneumatically conveyed, e.g., in a dilute phase. The FT4 Powder Rheometer includes a container for holding a powder sample and a rotor having a plurality of blades that is configured to move in the axial direction (e.g., vertically) through the powder sample while rotating the blades relative to the container. See, for example, U.S. Pat. No. 6,065,330 by Freeman et al., which is incorporated herein by reference in its entirety.

BFE and SE are determined by the FT4 Powder Rheometer using the Stability and Variable Flow Rate method ("the SVFR method"). The SVFR method includes seven test cycles using a stability method and four test cycles using a variable flow rate method, where each test cycle includes a conditioning step before the measurement is taken. The conditioning step homogenizes the sorbent composition by creating a uniform low stress packing of particles throughout the sample, which removes any stress history or excess entrained air prior to the measurement. The stability method includes maintaining the blade tip speed at about 100 millimeters per second (mm/s) during the test cycles, whereas the variable flow rate method involves four measurements using different blade tip speeds, namely about 100 mm/s, about 70 mm/s, about 40 mm/s and about 10 mm/s. The test measures the energy required to rotate the blade through the powder from the top of the vessel to the bottom and to rotate the blade through the powder from the bottom to the top of the vessel.

BFE is the total energy measured during the seventh cycle during the stability method measurements of the SVFR method described above (i.e., at a tip speed set at 100 mm/s) while the blade is rotating from the top of the vessel to the bottom. The BFE is a measurement of the energy required to establish a particular flow pattern in a (conditioned) powder, which is established by a downward counter-clockwise motion of the blade that puts the powder under a compressive stress. The BFE, when considered in conjunction with other powder characteristics, can be used to predict the pneumatic conveyance properties of the sorbent composition. For some particulate compositions, the lower the BFE, the more easily the sorbent composition can be made to flow in a regular and invariable manner, e.g., without significant variations in line pressure. However, for the sorbent compositions having a small volume of very fine particles disclosed herein, the composition will be relatively uncompressible due to a lack of entrained air that would otherwise surround the fine particles. That is, the particulate compositions disclosed herein begin in a relatively efficient packing state, and therefore blade movement in the rheometer is not accommodated by the air pockets that exist in more cohesive powders, i.e., powders containing higher levels of very fine particles. This results in more contact stress, and therefore a higher BFE than powders that include many very fine particles.

Thus, the particulate sorbent compositions disclosed herein may be characterized as having a BFE of at least about 275 millijoules (mJ), such as at least about 300 mJ, at least about 350 mJ, or even at least about 400 mJ.

The SE is the converse of the BFE, in the sense that the flow pattern is generated by an upward, clockwise motion of the blade in the powder rheometer, generating gentle lifting and low stress flow of the composition. Specifically, SE is the total energy measured during the seventh cycle during the stability method measurements of the SVFR method described above (i.e., at a tip speed set at −100 mm/s) while the blade is rotating from the bottom of the vessel to the top. As with the BFE, the reduced number of very fine particles in the present sorbent compositions will create an efficient particle packing state and the SE will be increased as compared to the same or similar powder that includes a larger volume of very fine particles.

In this regard, the particulate sorbent compositions disclosed herein may have a SE of at least about 6 millijoules per gram (mJ/g), such as at least about 6.5 mJ/g, or even at least about 6.7 mJ/g.

Conditioned Bulk Density ("CBD") may also be measured with the FT4 Powder Rheometer using the SVFR method. Bulk density may be measured at various packing conditions, and measuring the mass of a precise volume of conditioned powder provides the CBD. The CBD of a sorbent composition having a low percentage of very fine particles, e.g., that has been classified to remove very fine particles, will be higher than the CBD of the same powder that includes a higher percentage of very fine particles (e.g., that has not been classified to remove very fine particles).

Thus, a higher CBD may indicate the presence of fewer very fine-sized particles (e.g., <5 µm) in the composition. In this regard, the particulate sorbent compositions disclosed herein, particularly those comprising PAC derived from lignite coal, may be characterized as having a CBD of at least about 0.4 g/ml, such as at least about 0.46 g/ml, or even at least about 0.48 g/ml. Characterized another way, when the particulate sorbent composition is manufactured using a sizing step to reduce the number of very fine-sized particles (e.g., as is described above with respect to FIG. 2), the particulate sorbent composition (e.g., a size-controlled particulate sorbent composition) may have a CBD that is greater than the CBD of the composition before sizing (e.g., greater than the comminuted particulate carbonaceous material). In one characterization, the CBD of the size-controlled particulate sorbent composition is at least about 5% greater than the comminuted particulate carbonaceous material, such as at least about 10% greater.

AE is a measure of how much energy is required for a powder to become aerated, which is directly related to the cohesive strength of the powder (i.e., the tendency for particles to "stick" together). AE may be determined in the FT4 Powder Rheometer using the aeration test, which provides a precise air velocity to the base of the vessel containing the powder and measures the change in energy required to rotate the blades through the powder sample as the air velocity changes. During the aeration test, the air velocity (e.g., in mm/s) is varied over a range of from about 0.2 millimeters per second (mm/s) to about 2.0 mm/s, e.g., in 0.2 mm/s increments. The reported AE value is the measured energy at 1.0 mm/s.

As a general rule, the less cohesive, and therefore more easily fluidized, the sorbent composition, the lower the AE, and the more easily the sorbent composition can be pneumatically conveyed. In this regard, the particulate sorbent compositions disclosed herein may have an AE of not greater than about 54 mJ, such as not greater than about 30 mJ, not greater than about 20 mJ, or even not greater than about 10 mJ.

Another measure of cohesiveness is the AR, which is a unitless quantity expressing the ratio of AE at zero air velocity to the AE at a given air velocity. For purposes of this disclosure, including the claims, an air velocity of 1.0 mm/s for the AE is used to calculate the AR. If the AR is 1, then there is very little change in AE as the air velocity increases, and the composition is said to be cohesive. Powders with ARs of 2 to 20 are said to have average sensitivity to aeration, and most powders fall within this range. At an AR above 20, powders are considered sensitive to aeration. As a general rule, the larger the AR and the lower the AE, the less cohesive and therefore more easily fluidized and pneumatically conveyed the powder.

In this regard, the particulate sorbent compositions disclosed herein may have an AR of at least about 9, such as at least about 20, at least about 30, or even at least about 40.

The pressure drop, measured by the Permeability test, is a measure of the resistance to air flow between particles and through the powder bed. Pressure drop may be measured with the FT4 Powder Rheometer using a Permeability test which measures the pressure drop across the powder bed as a function of the applied normal stress (kinematic) in kPa. The less the pressure drop that is measured, the more likely the powder is to flow when pneumatically conveyed. Typically, a powder with low permeability will generate a pressure drop of over 50 mbar from at about 15 kPa and at an air velocity of 0.5 mm/s. In contrast, permeable powders will barely register a pressure drop at this air velocity.

The particulate sorbent compositions disclosed herein may have a pressure drop as measured by the Permeability test that does not exceed about 55 mbar at an applied normal stress of 15 kPa and at an air velocity of 0.5 mm/s. In certain characterizations, the pressure drop does not exceed about 40 mbar under the same conditions, such as not exceeding about 30 mbar, not exceeding about 25 mbar or even not exceeding about 20 mbar at an applied normal stress of 15 kPa and at an air velocity of 0.5 mm/s.

Compressibility is another characteristic that can affect flowability and may be measured by the FT4 Powder Rheometer using the compressibility test. Compressibility is a measure of how bulk density increases on compression. The less compressible a powder is, the more likely it is to flow when pneumatically conveyed because there are more paths for air. In other words, free flowing materials tend to be insensitive to compressibility. A highly compressible composition with lower flowability would be characterized by a compressibility of about 40% at 15 kPa for example; and a more flowable sample would have a compressibility of less than 20% at 15 kPa.

As such, the compressibility of the particulate sorbent compositions described herein may be not greater than about 20%, or even not greater than about 15%, at an applied stress of 15 kPa.

EXAMPLES

Samples of sorbent compositions are prepared to evaluate the pneumatic transport capability of the sorbent compositions disclosed herein as compared to known sorbents. Comparative Sample 1 has a median particle size of about 17 µm and particles less than 5 µm were about 17 vol. % of the sample. Comparative Sample 2 has a median particle size of about 10 µm and particles less than 5 µm were about 26 vol. %. Comparative Sample 3 has a median particle size of about 11 µm and particles less than 5 µm are about 24 vol. %. Sample 3 also includes about 4.5 vol. % of a bromide salt. Sample 4 is in accordance with the present disclosure and has a median particle size of about 13 µm and particles less than 5 µm are about 3 vol. %.

Table 1 indicates particle size characteristics for these samples.

TABLE 1

Particle Size Characteristics

| Sample Designation | Median particle size (μm) | Vol. % Finer than 5 μm | Vol. % Finer than 4 μm | Vol. % Finer than 3 μm | Vol. % Finer than 2 μm | Vol. % Finer than 1 μm | D5 (μm) | D95 (μm) |
|---|---|---|---|---|---|---|---|---|
| Comparative Sample 1 | 17 | 17.1 | 13.7 | 10.1 | 6.2 | 2.4 | 1.66 | 51.9 |
| Comparative Sample 2 | 10 | 26.5 | 21.6 | 16.3 | 10.4 | 3.9 | 1.20 | 32.5 |
| Comparative Sample 3 | 11 | 24.4 | 19.7 | 15.0 | 10.5 | 5.0 | 1.00 | 29.7 |
| Sample 4 | 13 | 3.2 | 1.6 | 0.9 | 0.5 | 0.0 | 5.65 | 27.0 |

Table 2 summarizes BFE (Basic Flow Energy), SE (Specific Energy), CBD (Conditioned Bulk Density), AE, AR, Compressibility (Comp.) and Pressure Drop values measured for the samples.

TABLE 2

Powder Characteristics of Various Samples

| Sample | BFE (mJ) | SE (mJ/g) | CBD (g/ml) | AE (mJ) | AR | Comp. (%) | Pressure Drop (mbar) |
|---|---|---|---|---|---|---|---|
| Comparative Sample 1 | 229.15 | 4.97 | 0.462 | 20.42 | 8.76 | 14-23 | 55 |
| Comparative Sample 2 | 195.73 | 4.48 | 0.376 | 27.20 | 5.18 | 15-24 | 70 |
| Comparative Sample 3 | 260.53 | 6.31 | 0.380 | 54.53 | 3.41 | 16-28 | 90 |
| Sample 4 | 418.75 | 6.92 | 0.484 | 8.15 | 48.29 | 9-13 | 20 |

Referring to Table 2, it is known that PAC having a larger median particle size (Comparative Sample 1) flows well when pneumatically conveyed. It is also known that Comparative Sample 3, having a reduced particle size, may experience pneumatic flow issues in some situations. It can be seen that Comparative Sample 1 has a lower BFE, a lower SE, lower AE, lower Compressibility, and a lower pressure drop than Comparative Sample 3. A lower AE may be indicative that Comparative Sample 1 is less cohesive than Comparative Sample 3. Finer powders exhibit more cohesive behavior, and so given the relative D50s, this makes sense. In general, it is known that a powder with a larger AR and smaller AE is less cohesive. Comparative Sample 1 exhibits both a larger AR and smaller AE than Comparative Sample 3, and this is therefore in alignment with what would be expected.

Sample 4 shows both the lowest AE, and highest AR. This is indicative of very good pneumatic conveyance properties for this composition.

Pressure drop is derived from the Permeability test as described above, and is greatly affected by cohesivity, size distribution, etc. In general, finer powders are less permeable, and therefore experience a higher pressure drop. This is due to the way the fine particles pack the spaces (voids) between the larger particles. Consequently, it is in alignment with expectations that Comparative Sample 1 has a lower pressure drop than Comparative Sample 3.

Sample 4 shows the lowest pressure drop across the powder bed, indicating high permeability. This is likely due to the absence of a large number of very fine particles in accordance with the present disclosure, and indicates very good flow properties.

Compressibility measures the change in density of the powder as a normal stress is applied. Compressibility is also affected by particle size distribution, cohesivity, etc. In general, finer powders are more cohesive, and therefore more compressible. Therefore it is to be expected that Comparative Sample 3 is more compressible than Comparative Sample 1.

Sample 4 experiences the lowest compressibility of the bulk powder. It can therefore be predicted that this composition experiences very good flow properties.

CBD is a factor describing the relationship between mass and volume, and is affected by true density, particle size and distribution, cohesion, etc. The interaction of all these factors controls how volume and void space interact. The CBD creates a repeatable condition wherein the powder is in a homogeneous, low stress packing state. The fact that Comparative Sample 1 has a higher CBD than Comparative Sample 3 is most likely indicative of the differences between particle size and particle size distributions. The more cohesive finer particles in Comparative Sample 3 are likely creating more void space, and lower density in the powder.

Sample 4, with the finer particles removed, has removed the majority of the void space. Consequently Sample 4 shows the highest CBD, with 27% higher CBD than sample 3, and 29% higher CBD than sample 2.

Figure 3:
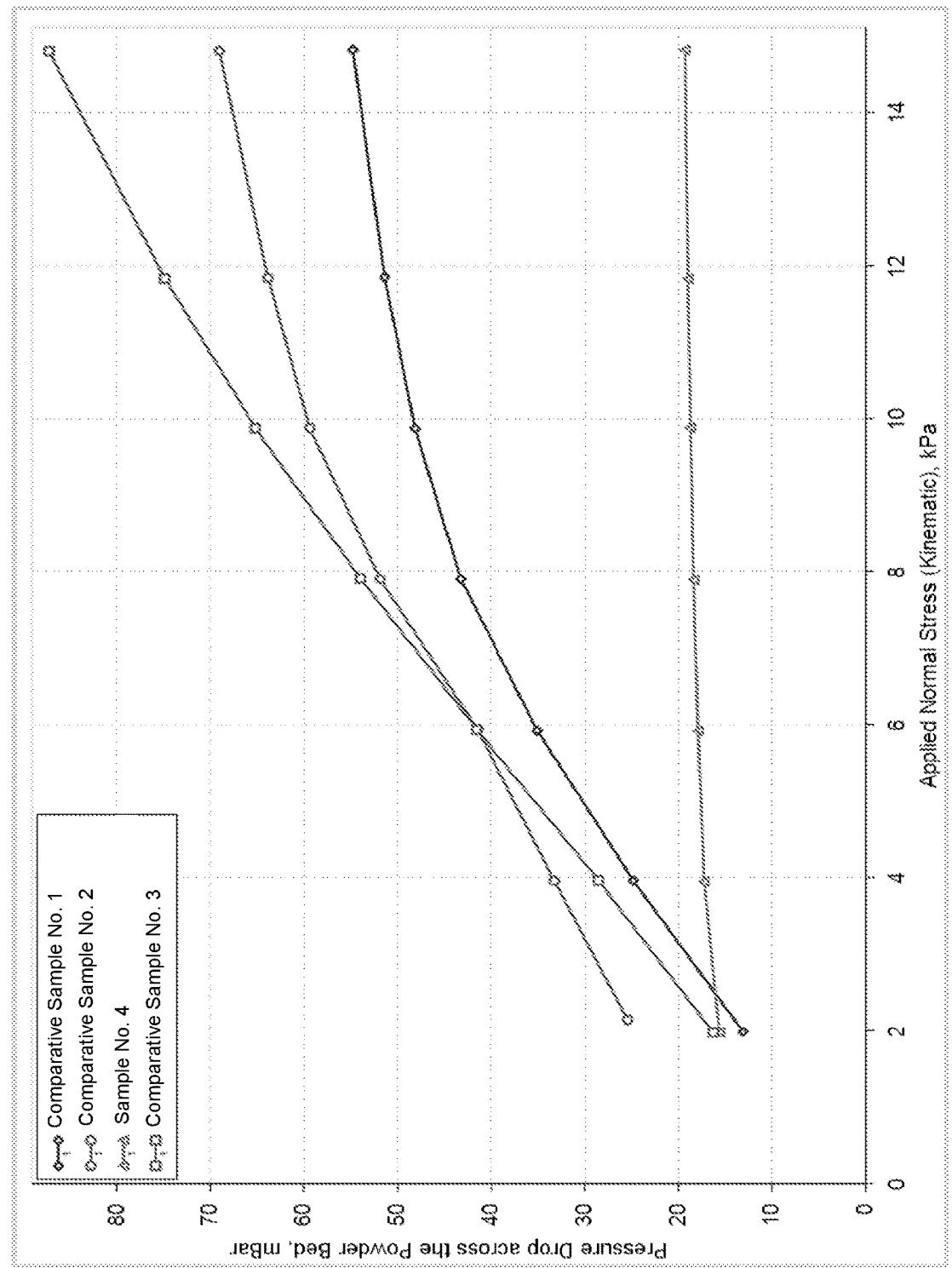
FIG. 3 illustrates the Permeability or pressure drop of a particulate sorbent composition disclosed herein with several comparative samples.

FIG. 3 illustrates the pressure drop across a powder bed (mBar) as a function of applied normal stress, kinematic (kPa) from 2 kPa to 15 kPa. The pressure drop is measured using an FT4 powder rheometer from Freeman Technology, Inc. Manufacturer's instructions are followed except an air velocity of 0.5 mm/s was used. Table 2, above, indicates pressure drop data measured for each sample at 15 kPa and at an air velocity of 0.5 mm/s.

Figure 4:
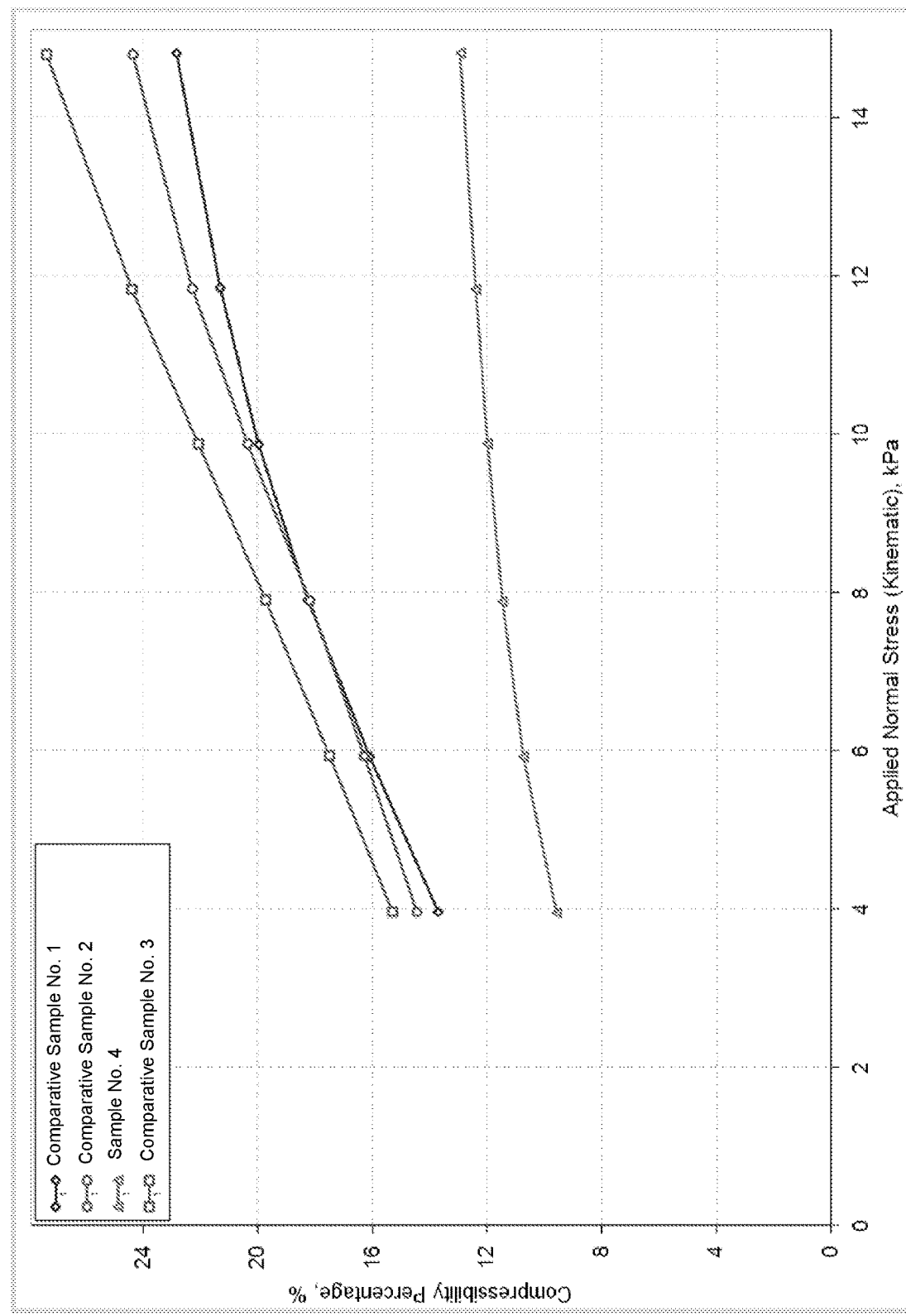
FIG. 4 illustrates the Compressibility of a particulate sorbent composition disclosed herein in with several comparative samples.

FIG. 4 illustrates compressibility of the samples. Compressibility is measured using the FT4 powder rheometer as described above. Compressibility is measured over a pneumatic applied normal stress range of 4 kPa to 15 kPa. As is illustrated by FIG. 4, Sample 4 according to the present disclosure has the lowest compressibility over the entire range of applied normal stress, and has a value of about 13% at an applied normal stress of 15 kPa. In contrast, the comparative samples have a Compressibility of well over 20% at an applied normal stress of 15 kPa.

As is illustrated by the above data, there may be no one exact measurement that best predicts flowability of a composition. How exactly median particle size affects flowability may not completely be understood. However, it has been found that reducing the percentage of particles smaller than 5 μm in a sorbent composition significantly increases flowability as evidenced by favorable changes in characteristics identified in Table 2 above of compositions of matter, especially sorbents such as PAC.

While various embodiments have been described in detail, it is apparent that modifications and adaptations of those embodiments will occur to those skilled in the art. However, is to be expressly understood that such modifications and adaptations are within the spirit and scope of the present disclosure.

What is claimed is:

1. A particulate sorbent composition, the particulate sorbent composition comprising porous carbonaceous particles, wherein the particulate sorbent composition has a median particle size of not greater than about 20 μm, and a particle size distribution and wherein, in the particle size distribution, not greater than about 10 vol. % of particles comprising the particulate sorbent composition have a particle size of not greater than about 5 μm.

2. The particulate sorbent composition of claim 1, wherein the median particle size is not greater than about 18 μm.

3. The particulate sorbent composition of claim 1, wherein the median particle size is not greater than about 15 μm.

4. The particulate sorbent composition of claim 1, wherein the median particle size is not greater than about 14 μm.

5. The particulate sorbent composition of claim 1, wherein the median particle size is not greater than about 12 μm.

6. The particulate sorbent composition of claim 1, wherein not greater than about 5 vol. % of the particles comprising the particulate sorbent composition have a particle size of not greater than about 5 μm.

7. The particulate sorbent composition of claim 1, wherein the porous carbonaceous particles are selected from the group consisting of activated carbon, reactivated carbon, carbonaceous char, and combinations thereof.

8. The particulate sorbent composition of any of claim 1, wherein not greater than about 5 vol. % of the particles comprising the particulate sorbent composition have a particle size of not greater than about 4 μm.

9. The particulate sorbent composition of claim 1, wherein the particulate sorbent composition has a Basic Flow Energy of at least about 300 mJ.

10. The particulate sorbent composition of claim 1, wherein the particulate sorbent composition has a Specific Energy of at least about 6 mJ/g.

11. The particulate sorbent composition of claim 1, wherein the particulate sorbent composition has an Aeration Energy of not greater than about 54 mJ.

12. The particulate sorbent composition of claim 1, wherein the particulate sorbent composition has an Aeration Ratio of at least about 20.

13. The particulate sorbent composition of any of claim 1, wherein the particulate sorbent composition has a Conditioned Bulk Density of at least about 0.4 g/ml.

14. The particulate sorbent composition of any of claim 1, wherein the particulate sorbent composition has a pressure drop as measured by a Permeability test of not greater than about 55 mbar at an applied normal stress of 15 kPa and at an air velocity of 0.5 mm/s.

15. The particulate sorbent composition of any of claim 1, wherein the particulate sorbent composition has a Compressibility of not greater than about 24% at an applied normal stress of 15 kPa.

16. The particulate sorbent composition of claim 1, wherein the particulate sorbent composition further comprises a halogen-containing compound.

17. The particulate sorbent composition of claim 16, wherein the halogen-containing compound is a halogen salt comprising an anionic group and a cationic group, wherein the anionic group is selected from the group consisting of bromides, bromates, hypobromites, iodides, iodates, hypoiodites, chlorides, chlorates, hypochlorites, and combinations thereof, and the cationic group is selected from the group consisting of an alkali metal, an alkaline earth metal, and a combination thereof.

18. The particulate sorbent composition of claim 1, wherein the particulate sorbent composition further comprises an acid gas agent.

19. The particulate sorbent composition of claim 18, wherein the acid gas agent is selected from the group consisting of alkali oxides, alkaline earth oxides, hydroxides, carbonates, bicarbonates, phosphates, silicates, aluminates, and combinations thereof.

20. The particulate sorbent composition of claim 1, wherein the particulate sorbent composition further comprises a flow agent.

21. A particulate sorbent composition, the particulate sorbent composition comprising porous carbonaceous particles and a halogen compound, wherein the particulate sorbent composition has a median particle size of not greater than about 20 μm and a particle size distribution, and wherein, in the particle size distribution, not greater than about 10 vol. % of particles comprising the particulate sorbent composition have a particle size of not greater than about 5 μm.

22. A particulate sorbent composition, the particulate sorbent composition comprising porous carbonaceous particles, wherein the particulate sorbent composition has a median particle size of not greater than about 20 μm and a particle size distribution, wherein, in the particle size distribution, not greater than about 10 vol. % of particles comprising the particulate sorbent composition have a particle size of not greater than about 5 μm, and wherein one or more of the following is true:
(i) the particulate sorbent composition has a Basic Flow Energy of at least about 300 mJ;
(ii) the particulate sorbent composition has a Specific Energy of at least about 6 mJ/g;
(iii) the particulate sorbent composition has an Aeration Energy of not greater than about 54 mJ;
(iv) the particulate sorbent composition has an Aeration Ratio of at least about 20;
(v) the particulate sorbent composition has a Conditioned Bulk Density of at least about 0.4 g/ml;
(vi) the particulate sorbent composition has a pressure drop as measured by a Permeability test of not greater than about 55 mbar at an applied normal stress of 15 kPa and at an air velocity of 0.5 mm/s; and
(vii) the particulate sorbent composition has a Compressibility of not greater than about 24% at an applied normal stress of 15 kPa.

23. The particulate sorbent composition of claim 22, wherein the particulate sorbent composition further comprises a halogen-containing compound.

24. The particulate sorbent composition of claim 22, wherein (i) is true.

25. The particulate sorbent composition of claim 22, wherein (ii) is true.

26. The particulate sorbent composition of claim 22, wherein (iii) is true.

27. The particulate sorbent composition of claim 22, wherein (iv) is true.

28. The particulate sorbent composition of claim 22, wherein (v) is true.

29. The particulate sorbent composition of claim 22, wherein (vi) is true.

30. The particulate sorbent composition of claim 22, wherein (vii) is true.

\* \* \* \* \*